United States Patent
Liebl et al.

(10) Patent No.: US 10,443,445 B2
(45) Date of Patent: Oct. 15, 2019

(54) METHOD FOR ADDITIVE MANUFACTURING OF A GAS TURBINE CASING PART

(71) Applicant: MTU Aero Engines AG, Munich (DE)

(72) Inventors: Christian Liebl, Bockhorn (DE); Richard Scharl, Karlsfeld (DE); Alexander Buck, Munich (DE); Daniel Kirchner, Munich (DE); Thomas Hess, Munich (DE)

(73) Assignee: MTU Aero Engines AG, Munich (DE)

( * ) Notice: Subject to any disclaimer, the term of this patent is extended or adjusted under 35 U.S.C. 154(b) by 806 days.

(21) Appl. No.: 15/081,225

(22) Filed: Mar. 25, 2016

(65) Prior Publication Data

US 2016/0290164 A1    Oct. 6, 2016

(30) Foreign Application Priority Data

Mar. 30, 2015  (EP) .................... 15161604

(51) Int. Cl.
| | |
|---|---|
| *F01D 25/24* | (2006.01) |
| *B22F 3/105* | (2006.01) |
| *F01D 25/12* | (2006.01) |
| *F01D 25/16* | (2006.01) |
| *B22F 5/00* | (2006.01) |
| *F01D 25/14* | (2006.01) |
| *F16C 35/04* | (2006.01) |
| *B33Y 10/00* | (2015.01) |
| *B33Y 80/00* | (2015.01) |

(52) U.S. Cl.
CPC ............ *F01D 25/24* (2013.01); *B22F 3/1055* (2013.01); *B22F 5/009* (2013.01); *F01D 25/125* (2013.01); *F01D 25/145* (2013.01); *F01D 25/162* (2013.01); *B33Y 10/00* (2014.12); *B33Y 80/00* (2014.12); *F05D 2220/32* (2013.01); *F05D 2230/22* (2013.01); *F05D 2230/31* (2013.01); *F16C 35/042* (2013.01); *Y02P 10/295* (2015.11); *Y02T 50/675* (2013.01)

(58) Field of Classification Search
None
See application file for complete search history.

(56) References Cited

U.S. PATENT DOCUMENTS

| | | | |
|---|---|---|---|
| 4,735,556 | A | 4/1988 | Fujikake et al. |
| 9,314,844 | B2 | 4/2016 | Geiger |
| 2014/0007588 | A1 | 1/2014 | Sanchez et al. |
| 2014/0147264 | A1 | 5/2014 | Belmonte et al. |

(Continued)

FOREIGN PATENT DOCUMENTS

| | | |
|---|---|---|
| DE | 102006049218 A1 | 4/2008 |
| DE | 102010046579 | 3/2012 |

(Continued)

*Primary Examiner* — Kayla Mccaffrey
(74) *Attorney, Agent, or Firm* — Davidson, Davidson & Kappel, LLC

(57) ABSTRACT

A method for manufacturing a turbine casing part having a bearing chamber system including a shell (1) and at least one bearing receptacle (2) and further having a protective heat shield (30) that at least partially encompasses the shell (1) radially outwardly, the protective heat shield (30) being additively manufactured integrally with the bearing chamber system by selectively solidifying layer-by-layer a feedstock material (5) is provided.

15 Claims, 2 Drawing Sheets

(56) References Cited

U.S. PATENT DOCUMENTS

2014/0161601 A1    6/2014  Geiger
2015/0044037 A1*  2/2015  Bucking ............... F01D 25/186
                                                                                          415/177
2015/0233293 A1*  8/2015  Grogg ...................... F02C 7/06
                                                                                          248/562

FOREIGN PATENT DOCUMENTS

| | | |
|---|---|---|
| DE | 102011108957 | 1/2013 |
| EP | 2511030 A2 | 10/2012 |
| FR | 2978197 | 1/2013 |

* cited by examiner

METHOD FOR ADDITIVE MANUFACTURING OF A GAS TURBINE CASING PART

This claims the benefit of European Patent Application EP15161604.2, filed Mar. 30, 2015 and hereby incorporated by reference herein.

The present invention relates to a method for additive manufacturing of a turbine casing part, as well as to a gas turbine casing part that is manufactured in accordance with such a method.

BACKGROUND

The temperatures that can occur in gas turbines, especially in the turbine portion thereof, may result in degradation, especially coking, of lubricant in a bearing chamber unless protective measures are taken.

SUMMARY OF THE INVENTION

Therefore, in addition to thermal coatings, it is known from in-house practice to use outwardly disposed protective heat shields to thermally shield the bearing chamber. Such shields have hitherto been manufactured as separate sheet-metal structures and subsequently joined to the bearing chamber.

It is an object of an embodiment of the present invention to improve a gas turbine casing part and/or the manufacture thereof.

The present invention provides a gas turbine casing part has a bearing chamber system, i.e. a bearing chamber, including a shell and one or more bearing receptacles, at each of which is disposed, in particular secured by an interlocking or friction fit and/or by a material-to-material bond, a bearing for radially and/or axially supporting, in particular in a lubricated manner, another gas turbine component, in particular a rotor, of a gas turbine; i.e., a bearing provided or adapted for this purpose.

The gas turbine casing part may, in particular, be a casing part of an aircraft engine gas turbine. In one embodiment, it is an outer (gas turbine) casing part. In another embodiment, it is an outer (gas turbine) casing part that is, or is intended or adapted to be, surrounded by or received in another outer gas turbine casing part. In one embodiment, it is a casing part of a turbine portion, in particular of at least one turbine stage.

In one embodiment, the shell is shaped like a partial ring, in particular a half ring, or a full ring, or is configured to have a closed periphery at least in an axial portion.

In accordance with an aspect of the present invention, the gas turbine casing part has a protective heat shield for thermally shielding the bearing chamber system. The protective heat shield circumferentially encompasses or embraces the shell radially outwardly, either completely; i.e., over its entire circumference, or partially; i.e., only over a part or portion of its circumference, and/or axially encompasses or embraces the shell, either completely; i.e., over its entire axial length, or partially; i.e., only over a part or portion of its axial length.

In one embodiment, the protective heat shield is shaped like a partial ring, in particular a half ring, or a full ring, or is configured to have a closed periphery at least in an axial portion.

In accordance with an aspect of the present invention, the protective heat shield is additively manufactured integrally with the bearing chamber system by selectively solidifying layer-by-layer a feedstock material; i.e., using an additive manufacturing process.

Advantageously, this makes it possible to provide a bearing chamber system having an integrated, outwardly disposed protective thermal or heat shield that thermally shields the bearing chamber system. The integral manufacture by an additive manufacturing process makes it possible, in particular, to produce a gas turbine casing part that is advantageous in terms of structural mechanics, in particular in terms of rigidity and/or vibration characteristics.

In one embodiment, the protective heat shield is additively manufactured with one or more local regions of reduced wall thickness and/or one or more local regions of increased wall thickness. In one embodiment, a wall thickness in a local region of reduced or increased wall thickness differs by at least 10%, in particular at least 25%, and/or at least 1 mm, in particular at least 2 mm, from axially and/or circumferentially adjacent wall thicknesses of the protective heat shield. In one embodiment, such local regions of reduced or increased wall thickness make it possible to provide the protective heat shield with a characteristic that is advantageous thermally and/or in terms of structural mechanics, in particular in terms of rigidity and/or vibration characteristics.

Additionally or alternatively, in one embodiment, the protective heat shield is additively manufactured with one or more beads. In one embodiment, a wall thickness in a bead differs by at least 10% and/or at least 1 mm from axially and/or circumferentially adjacent wall thicknesses of the protective heat shield and is radially sunk or bulged at least 1 mm, in particular at least 2 mm, with respect to these adjacent wall regions. In one embodiment, a bead extends in the circumferential and/or axial direction. In one embodiment, beads make it possible to provide the protective heat shield with a characteristic that is advantageous thermally and/or in terms of structural mechanics, in particular in terms of rigidity and/or vibration characteristics.

Additionally or alternatively, in one embodiment, the gas turbine casing part has one or more radial stiffening ribs disposed between the protective heat shield and the shell. The radial stiffening ribs are additively manufactured integrally with the protective heat shield and the bearing chamber system by selectively solidifying layer-by-layer the feedstock material, and connect the same together. In a refinement, one or more radial stiffening ribs extend in the circumferential and/or axial direction.

In one embodiment, the protective heat shield is additively manufactured with one or more opening(s) for partial or, at least substantially, complete removal of unsolidified feedstock material after the additive manufacture or layer-by-layer buildup of the gas turbine casing part. Additionally or alternatively, in one embodiment, the shell is additively manufactured with one or more opening(s) for partial or, at least substantially, complete removal of unsolidified feedstock material after the additive manufacture or layer-by-layer buildup of the gas turbine casing part.

Accordingly, in one embodiment, unsolidified feedstock material is partially or, at least substantially, completely removed from the or one or more of these opening(s) after the additive manufacture or layer-by-layer buildup of the gas turbine casing part.

In a refinement, after the partial or, at least substantially, complete removal of unsolidified feedstock material, the or one or more of these opening(s) is/are closed, in particular by a material-to-material bond or a friction fit and/or by an interlocking fit and/or by a cover. In one embodiment, this makes it possible to provide the protective heat shield with a characteristic that is advantageous thermally and/or in terms of structural mechanics, in particular in terms of rigidity and/or vibration characteristics. Additionally or alternatively, after the partial or, at least substantially, complete removal of unsolidified feedstock material, the or one or more of these opening(s) is/are not closed; i.e., remains/remain open. In one embodiment, this makes it possible to compensate for thermal expansions and/or to provide access for inspection and/or maintenance.

In one embodiment, the protective heat shield has a maximum wall thickness that is no greater than 75%, in particular no greater than 50%, in particular no greater than 25%, of a maximum wall thickness of the bearing chamber system, in particular of the shell, of a bearing receptacle and/or of a radial flange connecting the same. Additionally or alternatively, in one embodiment, a maximum wall thickness of the protective heat shield is no greater than 5 mm. Additionally or alternatively, in one embodiment, a maximum wall thickness of the bearing chamber system, in particular of the shell, of a bearing receptacle and/or of a radial flange connecting the same, is at least 10 mm, in particular at least 15 mm.

In one embodiment, the feedstock material that is not (yet) solidified is present in liquid or bulk form, in particular in powder form, and/or is thermally, chemically and/or optically solidified layer-by-layer in a selective manner.

BRIEF DESCRIPTION OF THE DRAWINGS

Further advantageous refinements of the present invention will be apparent from the dependent claims and the following description of preferred embodiments. To this end, the drawings show, partly in schematic form, in:

DETAILED DESCRIPTION

Figure 1:
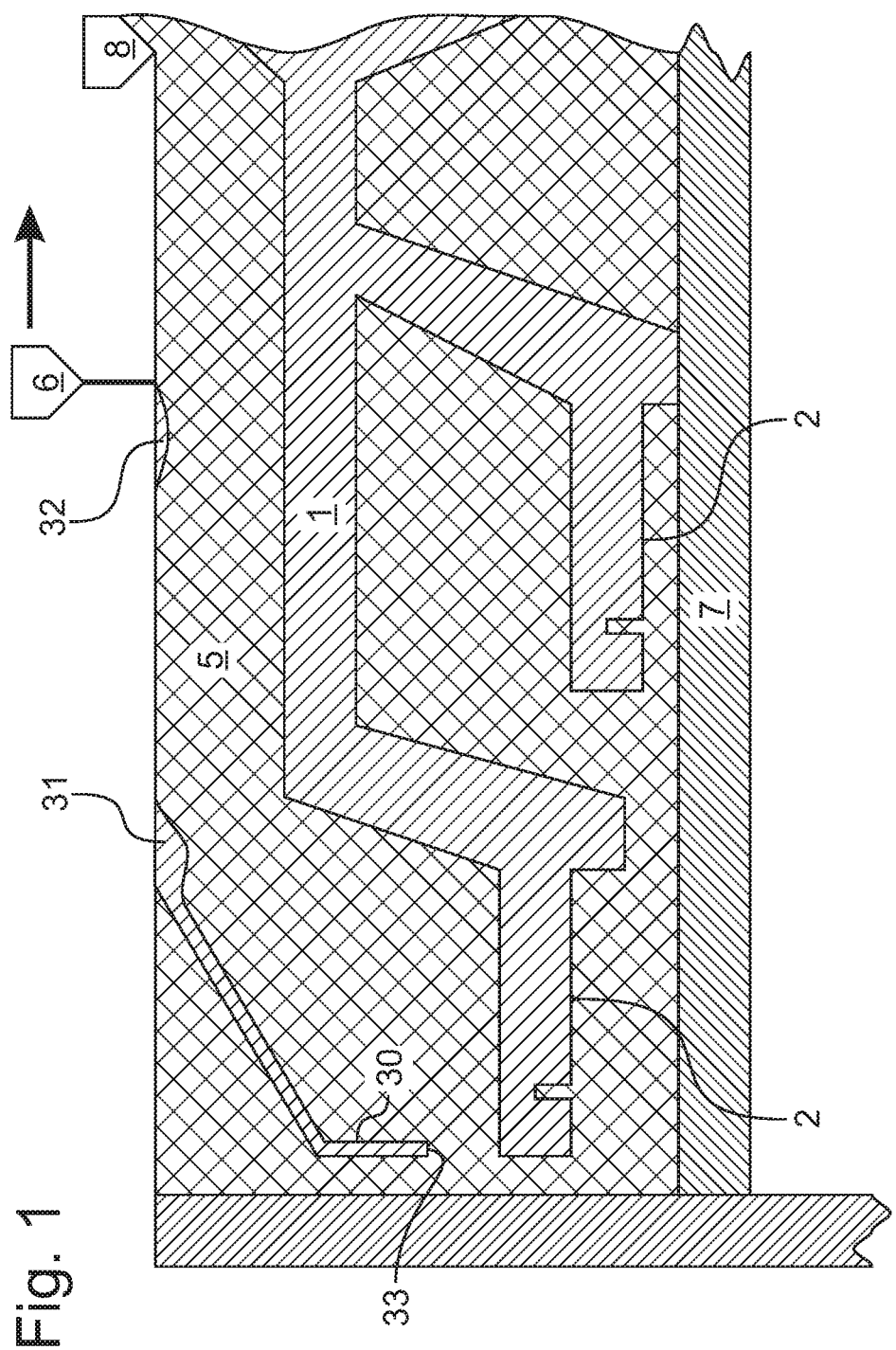
FIG. 1: the manufacture of a gas turbine casing part according to an embodiment of the present invention.
Figure 2:
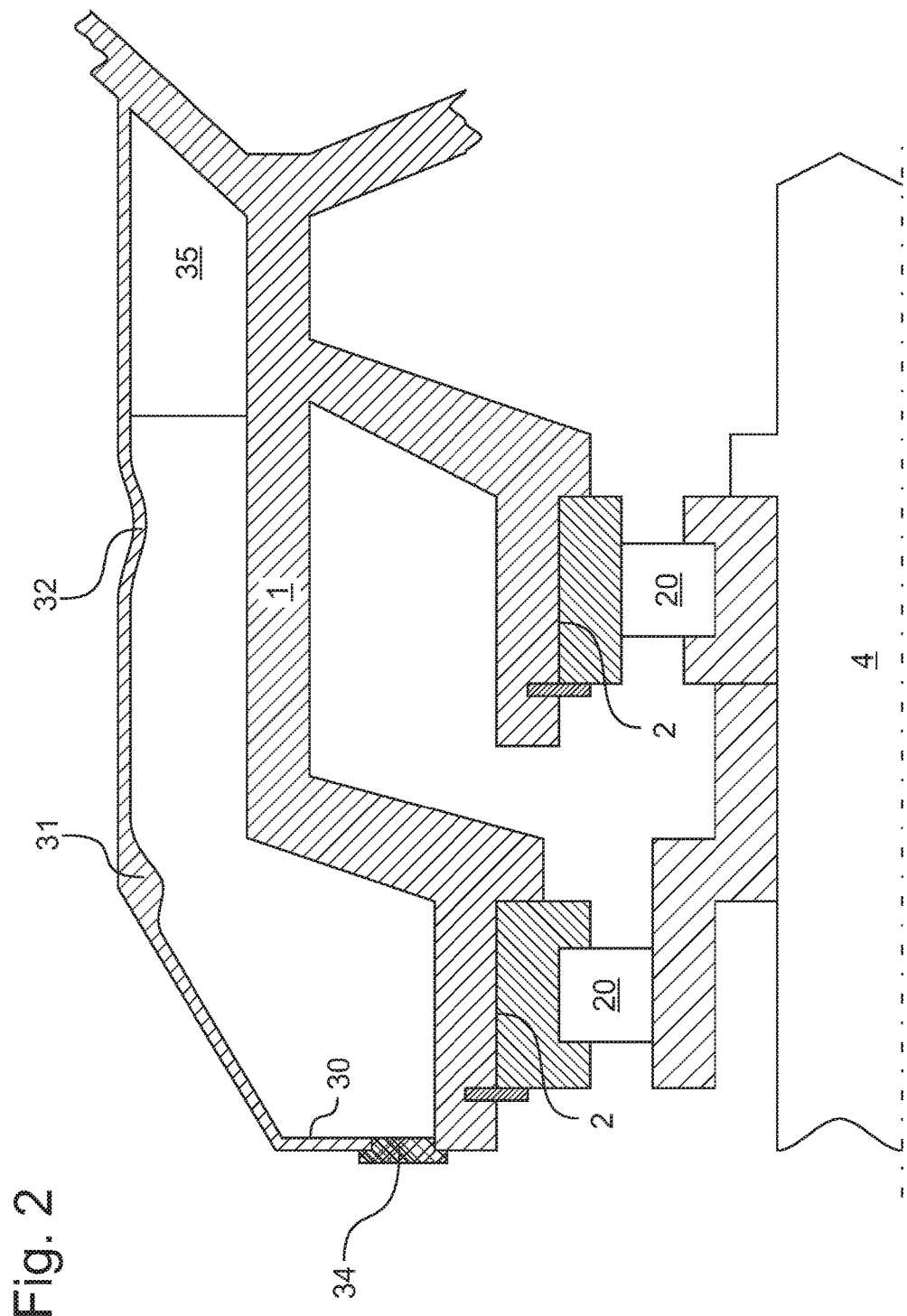
FIG. 2: a portion of a gas turbine having a gas turbine casing part according to an embodiment of the present invention.

FIG. 1 illustrates the additive manufacture of a gas turbine casing part according to an embodiment of the present invention. FIG. 2 shows the manufactured gas turbine casing part in an installed state in a gas turbine.

As can be seen especially in FIG. 2, the completed additively manufactured gas turbine casing part has a bearing chamber system including a shell 1 and two bearing receptacles 2, at each of which is, or is adapted to be, secured by an interlocking fit and/or a friction fit a bearing 20 for supporting, in a lubricated manner, a rotor 4 of the gas turbine, as well as a protective heat shield 30 radially outwardly encompassing shell 1.

As can be seen especially in FIG. 1, which shows a state during the additive manufacture of the gas turbine casing part, protective heat shield 30 is additively manufactured integrally with bearing chamber system 1, 2 by selectively solidifying layer-by-layer a feedstock material 5 that is in liquid or bulk form, in particular in powder form. To this end, feedstock material 5 is selectively solidified layer-by-layer, either thermally, chemically and/or optically, for example by a laser 6. In the process, a movable platform 7 moves the gas turbine casing part being produced in such a way that new feedstock material 5 is selectively solidified on the in FIG. 2 upper face thereof, and thereby bonded thereto, especially after each time a new layer of feedstock material is brought into place by a doctor blade 8, for example.

In the exemplary embodiment, the protective heat shield has, by way of example, a local region of increased wall thickness 31 as well as a bead 32 (see FIG. 2), which are manufactured additively (see FIG. 1).

As can be seen especially in FIG. 1, the protective heat shield is manufactured with an opening 33 for removal of unsolidified feedstock material 5. Accordingly, after the additive manufacture of the gas turbine casing part, unsolidified feedstock material is removed from opening 33.

The gas turbine casing part has radial stiffening ribs 35 that extend in the axial direction (horizontally in FIG. 2)) and are disposed between protective heat shield 30 and shell 1, and join them, in addition to the junctions at the left and right in FIG. 2.

In the exemplary embodiment, after removal of the unsolidified feedstock material, the opening is closed by a cover 34, in particular by a material-to-material bond or a friction fit and/or by an interlocking fit. In a modification, the opening may also be disposed in shell 1 and/or may not be closed; i.e., be or remain open.

Although the above is a description of exemplary embodiments, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection set forth in the appended claims and their equivalent combinations of features.

LIST OF REFERENCE NUMERALS 1 shell
2 bearing receptacle
20 bearing
30 protective heat shield
31 region of increased wall thickness
32 bead
33 opening
34 cover
35 rib
4 rotor
5 unsolidified feedstock material
6 laser
7 platform
8 doctor blade

What is claimed is:

1. A method for manufacturing a turbine casing part having a bearing chamber system including a shell and at least one bearing receptacle and further having a protective heat shield at least partially encompassing the shell radially outwardly, the method comprising:
additively manufacturing the protective heat shield integrally with the bearing chamber system by selectively solidifying layer-by-layer a feedstock material.

2. The method as recited claim 1 wherein the protective heat shield is additively manufactured with at least one local region of reduced wall thickness or at least one local region of increased wall thickness.

3. The method as recited in claim 1 wherein the protective heat shield is additively manufactured with at least one bead.

4. The method as recited in claim 1 wherein the protective heat shield or the shell is additively manufactured with at least one opening for at least partial removal of unsolidified feedstock material.

5. The method as recited in claim 4 further comprising at least partially removing the unsolidified feedstock material from the at least one opening.

6. The method as recited in claim 5 further comprising after the at least partial removal of unsolidified feedstock material, closing the at least one opening.

7. The method as recited in claim 6 wherein the opening is closed by a material-to-material bond or a friction fit and/or by an interlocking fit.

8. The method as recited in claim 5 wherein the at least one opening is not closed.

9. The method as recited in claim 1 wherein the protective heat shield has a maximum wall thickness no greater than 75% of a maximum wall thickness of the bearing chamber system or no greater than 5 mm.

10. The method as recited in claim 1 wherein the bearing chamber system has a maximum wall thickness that is no greater than 10 mm.

11. The method as recited in claim 1 wherein the feedstock material in unsolidified form is in liquid or bulk form.

12. The method as recited in claim 1 wherein the feedstock material is in powder form.

13. The method as recited in claim 1 wherein the feedstock material is thermally, chemically or optically selectively solidified layer-by-layer.

14. A turbine casing part manufactured according to the method as recited in claim 1.

15. A turbine casing part comprising:
a bearing chamber system including a shell and at least one bearing receptacle and further having a protective heat shield at least partially encompassing the shell radially outwardly, the protective heat shield being additively manufactured integrally with the bearing chamber system by selectively solidifying layer-by-layer a feedstock material.

* * * * *